United States Patent
Tsutatani et al.

(10) Patent No.: US 9,214,178 B2
(45) Date of Patent: Dec. 15, 2015

(54) MAGNETIC RECORDING MEDIUM FABRICATION METHOD AND APPARATUS

(71) Applicant: SHOWA DENKO K.K., Tokyo (JP)

(72) Inventors: Yasuyuki Tsutatani, Chiba (JP); Daisuke Shiomi, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 16 days.

(21) Appl. No.: 14/149,914

(22) Filed: Jan. 8, 2014

(65) Prior Publication Data

US 2014/0199476 A1    Jul. 17, 2014

(30) Foreign Application Priority Data

Jan. 15, 2013  (JP) .................. 2013-004783

(51) Int. Cl.
*H01L 21/67* (2006.01)
*G11B 5/84* (2006.01)

(52) U.S. Cl.
CPC .................. *G11B 5/8408* (2013.01)

(58) Field of Classification Search
CPC .............................. H01L 21/67; C23C 16/54
USPC ............. 427/127, 128, 129, 130, 131, 132; 118/715, 500, 719; 156/345.31, 345.32
See application file for complete search history.

(56) References Cited

U.S. PATENT DOCUMENTS

| | | | |
|---|---|---|---|
| 5,846,328 A | 12/1998 | Aruga et al. | |
| 7,155,115 B2 | 12/2006 | Cord | |
| 8,097,084 B2 * | 1/2012 | Geiser | H01L 21/67742 118/719 |
| 2004/0238122 A1 * | 12/2004 | Ishizawa et al. | 156/345.31 |
| 2008/0001237 A1 * | 1/2008 | Chang et al. | 257/411 |
| 2010/0221583 A1 * | 9/2010 | Foad et al. | 428/846 |
| 2014/0271083 A1 * | 9/2014 | Caveney | 414/749.5 |

FOREIGN PATENT DOCUMENTS

| | | |
|---|---|---|
| JP | 08-274142 | 10/1996 |
| JP | 2004-002971 | 1/2004 |

* cited by examiner

*Primary Examiner* — Michael Cleveland
*Assistant Examiner* — Tabassom Tadayyon Eslami
(74) *Attorney, Agent, or Firm* — IPUSA, PLLC

(57) ABSTRACT

A method of fabricating a magnetic recording medium sequentially forms a magnetic recording layer, a protection layer, and a lubricant layer on a stacked body. The stacked body is enclosed in a transfer container unit without exposing the stacked body to atmosphere after forming the protection layer on the stacked body by a deposition apparatus, and the transfer container unit is transported to a vapor-phase lubrication deposition apparatus. The stacked body is removed from the transfer container unit without exposing the stacked body to the atmosphere, in order to form the lubricant layer on the stacked body within the vapor-phase lubrication deposition apparatus.

11 Claims, 5 Drawing Sheets

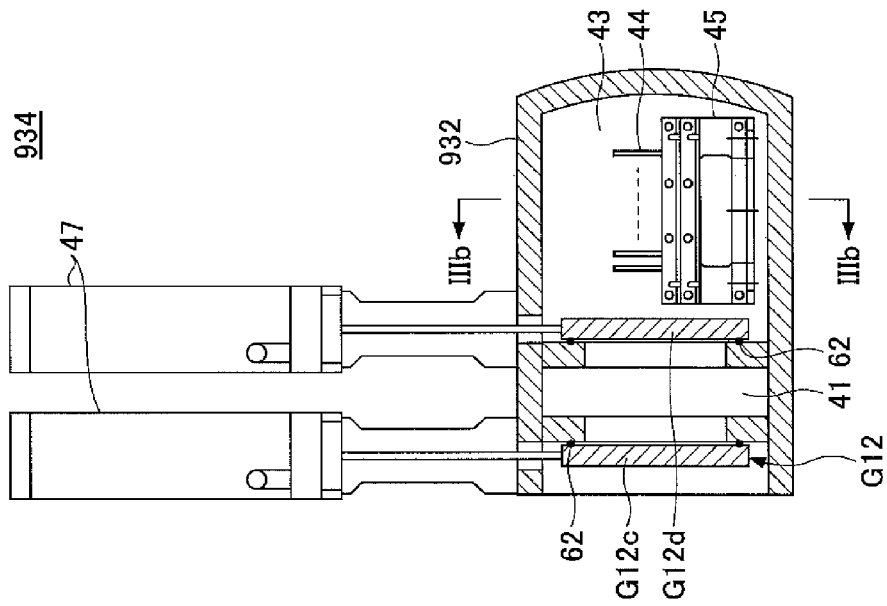
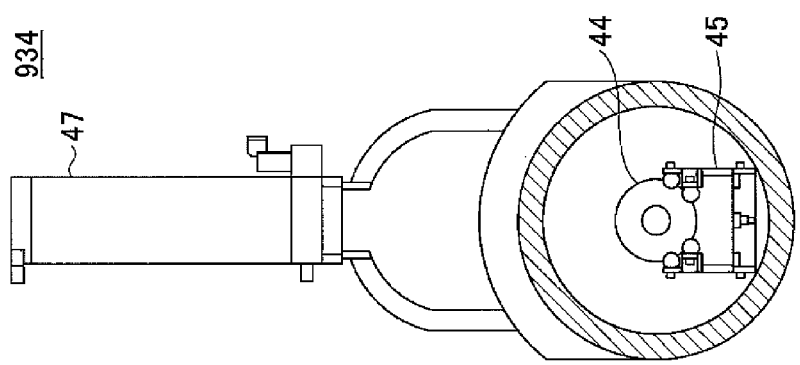

MAGNETIC RECORDING MEDIUM FABRICATION METHOD AND APPARATUS

CROSS-REFERENCE TO RELATED APPLICATIONS

This application is based upon and claims the benefit of priority of the prior Japanese Patent Application No. 2013-004783 filed on Jan. 15, 2013, the entire contents of which are incorporated herein by reference.

BACKGROUND OF THE INVENTION

1. Field of the Invention

The present invention relates to a magnetic recording medium fabrication method and a magnetic recording medium fabrication apparatus.

2. Description of the Related Art

Recently, a magnetic storage apparatus may be provided in various products, including personal computers, video recorders, data servers, and the like, and the importance of the magnetic storage apparatuses is increasing. These magnetic storage apparatuses include a magnetic recording medium that magnetically stores electronic data by magnetic recording. Examples of the magnetic storage apparatus include a magnetic disk drive, a flexible disk drive, a magnetic tape apparatus, and the like. A HDD (Hard Disk Drive) is an example of the magnetic disk drive.

For example, a general magnetic recording medium has a multi-layer stacked structure including an underlayer, an intermediate layer, a magnetic recording layer, and a protection layer that are deposited in this order on a nonmagnetic substrate, and a lubricant layer coated on a surface of the protection layer. In order to prevent mixing of impurities between the layers forming the magnetic recording medium during fabrication of the magnetic recording medium, an in-line vacuum deposition apparatus is used to continuously stack the layers under decompression, as described in Japanese Laid-Open Patent Publication No. 8-274142, for example.

In the in-line vacuum deposition apparatus, a plurality of deposition chambers having a deposition means capable of depositing a layer on the substrate are connected via a gate valve, together with a chamber for carrying out a thermal process and an auxiliary chamber, in order to form a single deposition line. When the substrate is set on a carrier and passed through the deposition line, the layers are successively deposited on the substrate to fabricate the magnetic recording medium having the desired structure.

Generally, the deposition line is arranged in a ring shape, and a substrate loading and unloading chamber is provided in the deposition line in order to load and unload the substrate with respect to the carrier. The carrier, which passes through the deposition chambers of the deposition line, reaches the substrate loading and unloading chamber where the substrate having the layers deposited thereon is unloaded from the carrier. In addition, after removing the substrate from the carrier, a new substrate to be subjected to the deposition is loaded onto the carrier in the substrate loading and unloading chamber.

In addition, as a method of forming the lubricant layer on the surface of the magnetic recording medium, a vapor-phase lubrication has been proposed in Japanese Laid-Open Patent Publication No. 2004-002971, for example. The vapor-phase lubrication places the magnetic recording medium within a vacuum chamber, and introduces a gas lubricant into the vacuum chamber.

In a case in which the magnetic recording medium having the multi-layer stacked structure described above is fabricated by the in-line vacuum deposition apparatus, a vacuum deposition apparatus that carries out sputtering is used to form the magnetic recording layer, a vacuum deposition apparatus that carries out ion beam deposition is used to form the protection layer, and a vacuum deposition apparatus that carries out vapor-phase lubrication is used to form the lubricant layer, for example. Hence, the layer forming processes (or deposition steps) from the formation of the magnetic recording layer until the formation of the lubricant layer can be carried out without exposing a stacked body to the atmosphere, and mixing of impurities into each of the layers from the atmosphere may be prevented.

However, according to the in-line vacuum deposition apparatus that continuously forms the magnetic recording layer, the protection layer, and the lubricant layer on the stacked body, a process gas used to form the protection layer and a process gas used to form the lubricant layer have considerably different physical properties, and the effects on the layers formed by these processes may be large when the process gases are mixed, to thereby deteriorate the quality of the layers that are formed.

In order to prevent the quality of the layers that are formed from deteriorating due to the mixing of the gases having the different physical properties, it may be desirable to sufficiently exhaust the residual process gas remaining within the deposition chamber after the process to form the protection layer ends, for example. However, a relatively long exhaust time may be required to sufficiently exhaust the residual process gas within the deposition chamber, and the productivity of the in-line vacuum deposition apparatus may deteriorate.

Hence, in the conventional magnetic recording medium fabrication method and apparatus, it may be difficult to simultaneously prevent the quality of the formed layer from deteriorating and improve the productivity.

SUMMARY OF THE INVENTION

Embodiments of the present invention may provide a magnetic recording medium fabrication method and a magnetic recording medium fabrication apparatus that may simultaneously prevent the quality of the formed layer from deteriorating and improve the productivity.

According to one aspect of the present invention, a method of fabricating a magnetic recording medium may sequentially form a magnetic recording layer, a protection layer, and a lubricant layer on a stacked body, and include enclosing the stacked body in a transfer container unit without exposing the stacked body to atmosphere after forming the protection layer on the stacked body by a deposition apparatus; transporting the transfer container unit to a vapor-phase lubrication deposition apparatus; and removing the stacked body enclosed within the transfer container unit from the transfer container unit without exposing the stacked body to the atmosphere, and forming the lubricant layer on the stacked body within the vapor-phase lubrication deposition apparatus by vapor-phase lubrication, wherein the transfer container unit includes a transfer container configured to enclose the stacked body, an auxiliary chamber detachably connected to the deposition apparatus and the vapor-phase lubrication deposition apparatus, a gate valve configured to connect the transfer container and the auxiliary chamber, and a separation chamber partitionable by first and second valve elements of the gate valve, and wherein the separation chamber and the auxiliary chamber communicate with each other in a state in which the first valve element is open, and the separation chamber and the accommodating chamber communicate with each other in a state in which the second valve element is open.

Other objects and further features of the present invention will be apparent from the following detailed description when read in conjunction with the accompanying drawings.

BRIEF DESCRIPTION OF THE DRAWINGS

FIGS. 3A and 3B are diagrams illustrating another example of the transfer container unit;

DESCRIPTION OF THE PREFERRED EMBODIMENTS

Figure 1:
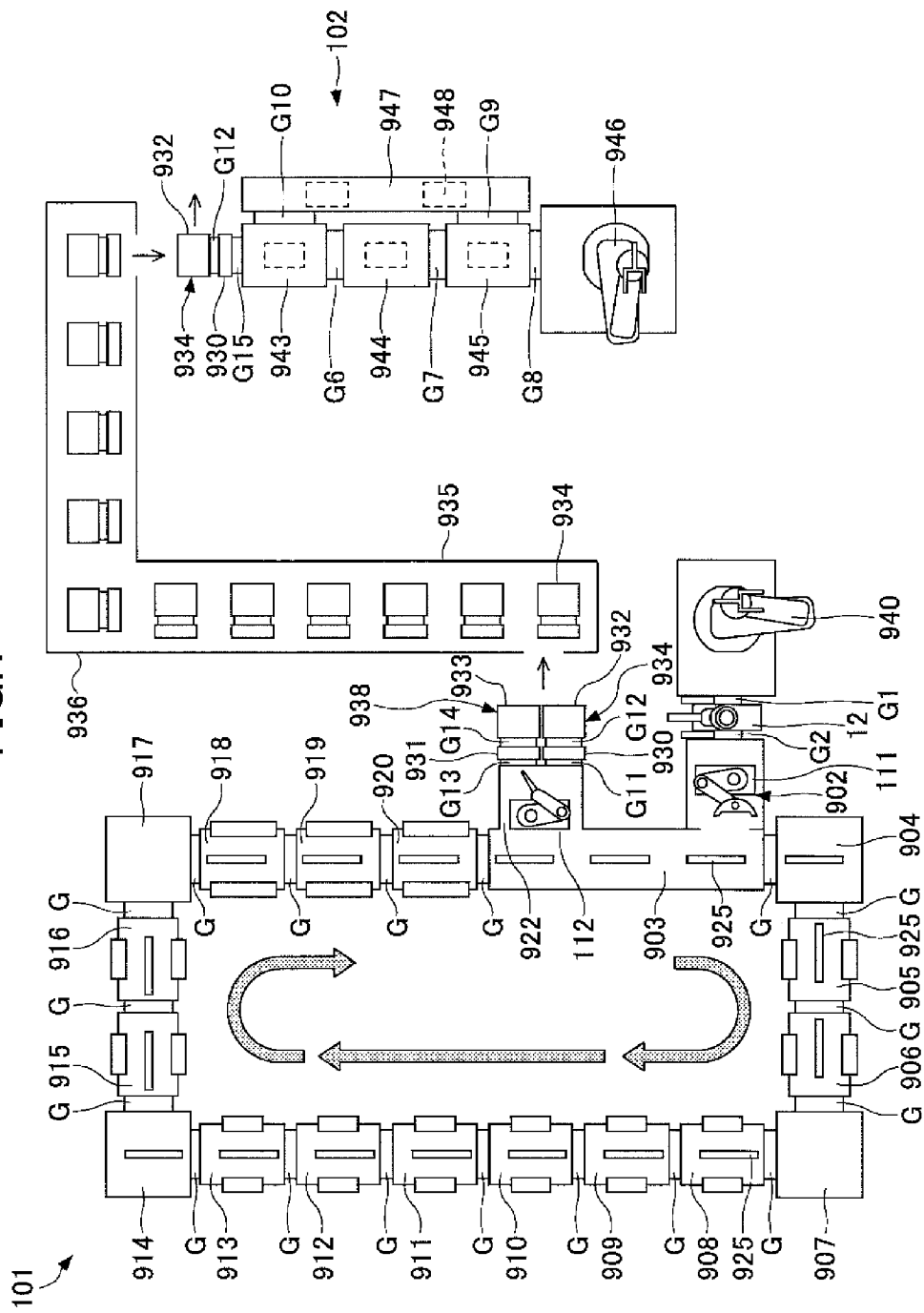
FIG. 1 is a schematic diagram illustrating an example of a magnetic recording medium fabrication apparatus in one embodiment of the present invention.

A description will be given of the magnetic recording medium fabrication method and apparatus in each embodiment of the present invention, by referring to the drawings.

In a case in which the magnetic recording medium having the multi-layer stacked structure described above is fabricated using the in-line vacuum deposition apparatus, the process gas (or sputtering gas) used to form the magnetic recording layer is an argon gas, for example, the process gas used to form the protection layer is a hydrocarbon gas, a hydrogen gas, or an argon gas, for example, and the process gas used to form the lubricant layer is a high molecular compound, for example. For this reason, between the process to form the magnetic recording layer and the process to form the protection layer, the effects of the process gases mixing between the two adjacent processes may be relatively small. On the other hand, between the process to form the protection layer and the process to form the lubricant layer, the process gases used in the two adjacent processes have considerably different physical properties, and the effects on the layers formed by the two adjacent processes may be large when the process gases mix between the two adjacent processes, to thereby deteriorate the quality of the layers that are formed. In order to prevent the quality of the layers that are formed from deteriorating due to the mixing of the gases between the two adjacent processes, it may be desirable to sufficiently exhaust the residual process gas remaining within the deposition chamber after each layer forming process ends, for example.

In order to prevent the quality of the layers that are formed from deteriorating due to the mixing of the gases between the two adjacent processes, it is conceivable to sufficiently exhaust the residual process gas remaining within the deposition chamber after each layer forming process ends, and to thereafter open a gate valve between the two adjacent deposition chambers to transfer the substrate from one deposition chamber to the other. However, a relatively long exhaust time may be required to sufficiently exhaust the residual process gas within the deposition chamber, and productivity of the in-line vacuum deposition apparatus may deteriorate.

It is also conceivable to provide an auxiliary vacuum chamber between the two adjacent deposition chambers, in order to increase the distance between the two adjacent deposition chambers. However, according to experiments conducted by the present inventors, it was confirmed that slight mixture of the process gases occurs between the two adjacent deposition chambers, even when the distance between the two adjacent deposition chambers is increased. Further, according to experiments conducted by the present inventors, it was confirmed that the process gas adheres onto the carrier that transports the substrate, and the mixture of the process gases occurs via the carrier having the process gas adhered thereon.

On the other hand, in order to prevent the quality of the layers that are formed from deteriorating due to the mixing of the process gases having the different physical properties, it is conceivable to provide an airlock chamber between the chamber in which the protection layer is formed and the chamber in which the lubricant layer is formed. However, when the airlock chamber is provided, the inside of the airlock chamber needs to be frequently cleaned because the inside of the airlock chamber is easily contaminated, and as a result, the productivity of the in-line vacuum deposition apparatus may deteriorate.

Accordingly, in one embodiment of the present invention, in the fabrication method and apparatus that fabricates the magnetic recording medium having the multi-layer stacked body by sequentially forming the magnetic recording layer, the protection layer, and the lubricant layer in this order on a stacked body, a deposition apparatus to form the lubricant layer is provided independently of an in-line deposition apparatus to form the magnetic recording layer and the protection layer. In addition, the stacked body after the protection layer is formed is enclosed within a transfer container unit without making contact with the atmosphere, and the transfer container unit enclosing the stacked body is transported to a vapor-phase lubrication deposition apparatus. When the transfer container unit is transported to the vapor-phase lubrication deposition apparatus, the stacked body enclosed within the transfer container unit is removed from the transfer container unit without making contact with the atmosphere and set within the vapor-phase lubrication deposition apparatus. Then, the lubricant layer is formed on the stacked body within the vapor-phase lubrication deposition apparatus.

For example, the transfer container unit may include a transfer container to enclose the stacked body, an auxiliary chamber detachably connected to the deposition apparatus to form the lubricant layer and the vapor-phase lubrication deposition apparatus, a gate valve to connect the transfer container and the auxiliary chamber, and a separation chamber that may be partitioned by first and second valve elements of the gate valve. The separation chamber may communicate with the auxiliary chamber in a state in which the first valve element is open, and the separation chamber may communicate with an accommodating chamber in a state in which the second valve element is open.

By forming the lubricant layer by the vapor-phase lubrication deposition without making contact with the atmosphere after the protection layer is formed on the stacked body, it is possible to prevent impurities and the like from becoming mixed between the protection layer and the lubricant layer.

In addition, because the chamber in which the protection layer is formed and the chamber in which the lubricant layer is formed may be completely separated, the process gasses used in the two chambers will not become mixed, and it is possible to prevent the quality of the layers formed in the two chambers from deteriorating due to mixing of the process gases.

Furthermore, a carrier to transport the substrate may be completely separated between the process of forming the protection layer and the process of forming the lubricant layer. For this reason, the lubricant will not mix into the process of forming the protection layer, and it is possible to prevent the quality of the protection layer from deteriorating.

By providing an auxiliary transfer container unit, the inside of the transfer container unit may be cleaned without stopping the in-line deposition apparatus that forms the protection layer and the like and the vapor-phase lubrication deposition apparatus that forms the lubricant layer. In this case, the productivity of the magnetic recording medium may be improved.

In one embodiment of the present invention, the inside of the transfer container may be vacuum. In this case, after the protection layer is formed on the stacked body, the lubricant layer may be formed on the stacked body by the vapor-phase lubrication deposition without causing the stacked body to make contact with the atmosphere. As a result, the impurities and the like may be prevented from becoming mixed between the protection layer and the lubricant layer.

In addition, in one embodiment of the present invention, the inside of the transfer container may be an inert gas atmosphere. In this case, after the protection layer is formed on the stacked body, the lubricant layer may be formed on the stacked body by the vapor-phase lubrication deposition without causing the stacked body to make contact with the atmosphere, and the impurities and the like may be prevented from becoming mixed between the protection layer and the lubricant layer. Moreover, from the point of view of improving adhesion of the lubricant onto the surface of the protection layer, the inert gas pressure within the transfer container may preferably be in a range of 10 Pa to 200 Pa.

FIG. 1 is a schematic diagram illustrating an example of the magnetic recording medium fabrication apparatus in one embodiment of the present invention. The magnetic recording medium fabrication apparatus illustrated in FIG. 1 may include a deposition apparatus 101 configured to form the layers of the magnetic recording medium up to the protection layer, a vapor-phase lubrication deposition apparatus 102 configured to form the lubricant layer on the surface of the protection layer, and a conveyor 935 provided between the deposition apparatuses 101 and 102 and configured to transport transfer container units 934 and 938 respectively enclosing the stacked body from the deposition apparatus 101 to the vapor-phase lubrication deposition apparatus 102. The conveyor 935 is an example of a transport apparatus (or a transport means) for transporting the transport transfer container units 934 and 938 respectively enclosing the stacked body from the deposition apparatus 101 to the vapor-phase lubrication deposition apparatus 102.

The deposition apparatus 101 may include a substrate loading and unloading chamber 903, a first corner chamber 904, a first process chamber 905, a second process chamber 906, a second corner chamber 907, a third process chamber 908, a fourth process chamber 909, a fifth process chamber 910, a sixth process chamber 911, a seventh process chamber 912, an eighth process chamber 913, a third corner chamber 914, a ninth process chamber 915, a tenth process chamber 916, a fourth corner chamber 917, an eleventh process chamber 918, a twelfth process chamber 919, and a thirteenth process chamber 920 that are connected in a ring shape via inter-chamber gate valves G. Each of the chambers 903 through 920 is surrounded by a plurality of partitioning walls, and includes an internal space that may be put into a decompression state.

The inter-chamber gate valve G, which may freely open and close at a high speed, may be provided between two mutually adjacent chambers (for example, the chambers 905 and 906). All of the gate valves G are opened and closed at the same timing. Hence, each of a plurality of carriers 925 that transport substrates (not illustrated) may move from one to the other of the mutually adjacent chambers with regularity.

Each of the first through thirteenth process chambers 905, 906, 908 through 913, 915, 916, and 918 through 920 may be provided with a substrate heating means (or substrate heater), a deposition means (or deposition part), a process gas supplying means (or process gas supplying part), an exhaust means (or exhaust part), and the like. The deposition means may be formed by a sputtering apparatus, an ion beam deposition apparatus, or the like. The gas supplying means and the exhaust means may cause the process gas to flow when necessary. For example, the first process chamber 905 up to the tenth process chamber 916 may be used to form the layers of the magnetic recording medium up to the magnetic recording layer. The eleventh and twelfth process chambers 918 and 919 may be used to form the protection layer, and the thirteenth process chamber 920 may be used as an auxiliary chamber.

A base pressure (or reaching pressure) of each of the first through thirteenth process chambers 905, 906, 908 through 913, 915, 916, and 918 through 920 may be set to $1\times10^{-5}$ Pa, for example.

The corner chambers 904, 907, 914, and 917 may be arranged at corners of the magnetic recording medium deposition apparatus 101, and change an orientation of the carrier 925 in accordance with a moving direction of the carrier 925. The inside of each of the corner chambers 904, 907, 914, and 917 may be set to vacuum, and each of the corner chambers 904, 907, 914, and 917 may rotate the carrier 925 in a decompression state.

As illustrated in FIG. 1, the substrate loading and unloading chamber 903 is arranged between the first corner chamber 904 and the auxiliary chamber 921. The internal space of the substrate loading and unloading chamber 903 may be larger than that of other chambers. Three carriers 925 may be arranged within the substrate loading and unloading chamber 903, such that the substrate is loaded onto one carrier 925 and the substrate is unloaded from another carrier 925. Still another carrier 925 at the center between the two carriers 925 is in a standby state. Each of the carriers 925 may be transported simultaneously in a direction indicated by arrows in FIG. 1. The substrate loading and unloading chamber 903 may be connected to a substrate input chamber 902 and a substrate output chamber 922.

A vacuum robot 111 may be arranged within the substrate input chamber 902, and another vacuum robot 112 may be arranged within the substrate output chamber 922. The vacuum robots 111 and 112 are examples of a transport apparatus. The substrate input chamber 902 may load the substrate onto the carrier 925 within the substrate loading and unloading chamber 903, using the vacuum robot 111. In addition, the substrate output chamber 922 may unload the substrate from the carrier 925 within the substrate loading and unloading chamber 903, using the vacuum robot 112.

The substrate input chamber 902 may be connected to an airlock chamber 12 via an inter-chamber gate valve G2. The substrate output chamber 922 may be connected to a first transfer container (or transport container) 932 via an inter-chamber gate valve G11, and to a second transfer container (or transport container) 933 via an inter-chamber gate valve G13. A gate valve G12 and an auxiliary chamber 930 may be provided at a transfer port of the first transfer container 932. A gate valve G14 and an auxiliary chamber 931 may be provided at a transfer port of the second transfer container 933. The transfer container unit 934 may be formed by the first transfer container 932, the gate valve G12, and the auxiliary chamber 930. The transfer container unit 938 may be formed by the second transfer container 933, the gate valve G14, and the auxiliary chamber 931. The transfer container units 934 and 938 may be detachable with respect to the deposition apparatus 101 and the vapor-phase lubrication deposition apparatus 102, and are alternately used to transport the substrate from the deposition apparatus 101. The transfer container units 934 and 938 that are removed from the deposition apparatus 101 may be set on the conveyor 935 and transported to the vapor-phase lubrication deposition apparatus 102.

Figure 2A:
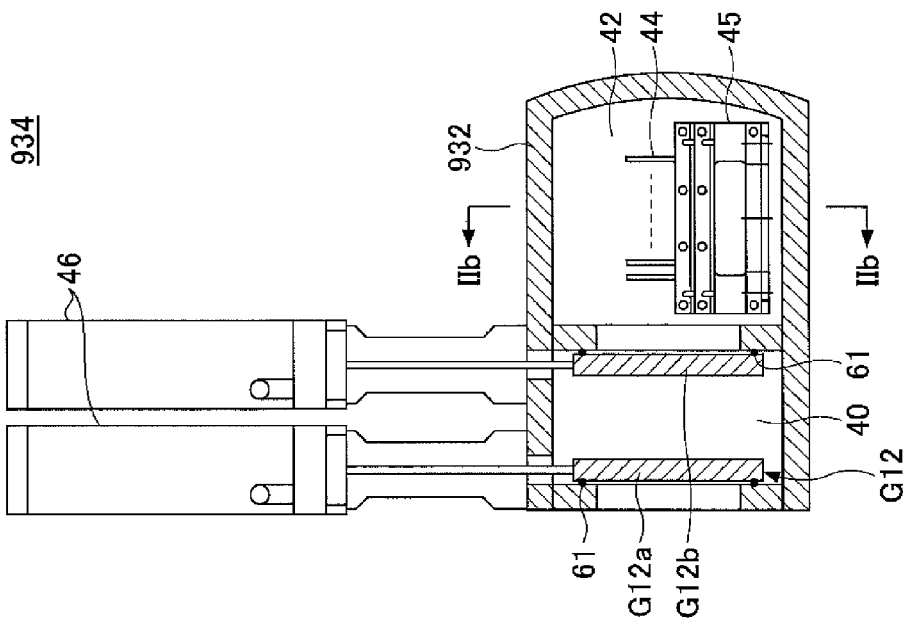
FIGS. 2A and 2B are diagrams illustrating an example of a transfer container unit.
Figure 2B:
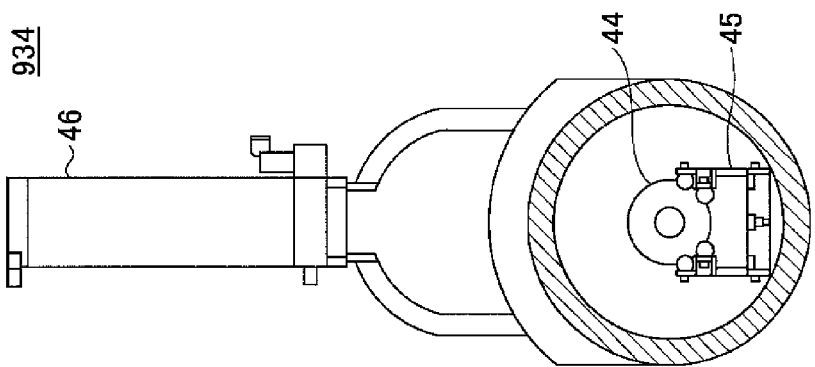

FIGS. 2A and 2B are diagrams illustrating an example of the transfer container unit for a case in which the inside of the first transfer container is vacuum. FIG. 2A illustrates a cross section of the transfer container unit 934, and FIG. 2A illustrates a cross section along a line IIb-IIb in FIG. 2A.

As illustrated in FIGS. 2A and 2B, the gate valve G12 may include valve elements G12$a$ and G12$b$, a separation chamber 40 that may be partitioned or partitionable) by the valve elements G12$a$ and G12$b$, an O-ring 61 that seals the valve elements G12$a$ and G12$b$, and a cylinder 46 that is an example of an opening and closing means (or opening and closing mechanism) to open and close the valve elements G12$a$ and G12$b$. A substrate setting unit 45 on which a plurality of substrates 44 may be set, is arranged within an accommodating chamber 42 within the first transfer container 932. In a state in which the valve element G12$a$ is open, the separation chamber 40 communicates with the auxiliary chamber 930. On the other hand, in a state in which the valve element G12$b$ is open, the separation chamber 40 communicates with the accommodating chamber 42.

The deposition apparatus 101 illustrated in FIG. 1 may processes approximately twenty (20) to thirty (30) substrates 44 per minute, for example. Hence, the frequency at which the transfer container units 934 and 938 are mounted to and removed from the deposition apparatus 101, and the frequency at which the gate valves G11 through G14 are opened and closed may be relatively high. For this reason, a high-speed operation may be required of the gate valves G11 through G14. In order to increase the operation speed of the gate valves G11 through G14, it may be desirable to simplify the valve configuration. On the other hand, the quality of the layer that is formed may deteriorate if the air tightness of the gate elements of each of the gate valves G11 through G14 deteriorates due to the simplified valve configuration.

In the transfer container unit 934 illustrated in FIGS. 2A and 2B, the valve elements of the gate valve G12 have a double structure to fill Ar into the separation chamber 40 between the two valve elements G12$a$ and G12$b$, in order to prevent air from entering the accommodating chamber 42. When pressurizing the separation chamber 40 with an inert gas, the pressure may ideally be atmospheric pressure or higher. However, the effect of preventing the air from entering the accommodating chamber 42 may also be achieved when the accommodating chamber 40 is pressurized and the separation chamber 40 is depressurized with respect to the atmospheric pressure. When the transfer container unit 934 illustrated in FIGS. 2A and 2B is used, mixing of impurities into the stacked body (substrate 44) from the air (or atmosphere) is positively prevented.

FIGS. 3A and 3B are diagrams illustrating another example of the transfer container unit 934. FIG. 3A illustrates a cross section of the transfer container unit 934, and FIG. 3A illustrates a cross section along a line IIIb-IIIb in FIG. 3A.

As illustrated in FIGS. 3A and 3B, the gate valve G12 may include valve elements G12$c$ and G12$d$, a separation chamber 41 that may be partitioned by the valve elements G12$c$ and G12$d$, an O-ring 62 that seals the valve elements G12$c$ and G12$d$, and a cylinder 47 that is an example of an opening and closing means (or opening and closing mechanism) to open and close the valve elements G12$c$ and G12$d$. The substrate setting unit 45 on which the plurality of substrates 44 may be set, is arranged within an accommodating chamber 43 within the first transfer container 932. In a state in which the valve element G12$c$ is open, the separation chamber 41 communicates with the auxiliary chamber 930. On the other hand, in a state in which the valve element G12$d$ is open, the separation chamber 41 communicates with the accommodating chamber 43.

In the transfer container unit 934 illustrated in FIGS. 3A and 3B, the valve elements of the gate valve G12 have the double structure to make the separation chamber 41 between the two valve elements G12$c$ and G12$d$ vacuum, in order to prevent air from entering the accommodating chamber 43. When the transfer container unit 934 illustrated in FIGS. 3A and 3B is used, mixing of impurities into the stacked body (substrate 44) from the air (or atmosphere) is positively prevented.

The oriented direction of the valve elements G12$a$ and G12$b$ in FIGS. 2A and 2B is different from the oriented direction of the valve elements G12$c$ and G12$d$ in FIGS. 3A and 3B, because of a relationship of a pressure difference between the separation chamber 40 within the transfer container unit 934 and the accommodating chamber 42 within first transfer container 932, and a relationship of a pressure difference between the separation chamber 41 within the transfer container unit 934 and the accommodating chamber 43 within first transfer container 932. In other words, the valve elements G12$a$ and G12$b$ illustrated in FIG. 2A are arranged on the inner side of the separation chamber 40, while the valve elements G12$c$ and G12$d$ illustrated in FIG. 3A are arranged on the outer side of the separation chamber 41.

The transfer container unit 938 may have a configuration similar to that of the transfer container unit 934 illustrated in FIGS. 2A and 2B or FIGS. 3A and 3B, and a description and illustration thereof will be omitted.

A plurality of substrates (for example, 50 substrates) may be accommodated within each of the transfer containers 932 and 933, in a state shut off from the atmosphere. The transfer container units 934 and 938 may be removed from the deposition apparatus 101 at the auxiliary chambers 930 and 931, respectively. The airlock chamber 12 and the first and second transfer containers 932 and 933 may operate so that the following processes are repeated.

(Input of Substrate to Deposition Apparatus)

The input of the substrate to the deposition apparatus 101 may be carried out by the process including the following steps s1 through s8.

Step s1: Gate valves G1 and G2 are closed. The gate valves such as the gate valves G1 and G2 may be opened and closed by a known opening and closing means (or opening or closing mechanism), and thus, the illustration and description of the opening and closing means will be omitted.

Step s2: The inside of the airlock chamber 12 is set to atmospheric pressure.

Step s3: The gate valve G1 is opened.

Step s4: A plurality of substrates (for example, 50 substrates) are input to an airlock chamber 12 by a substrate input robot 940 which is an example of a transport apparatus.

Step s5: The gate valve G1 is closed.

Step s6: The inside of the airlock chamber 12 is decompressed to vacuum.

Step s7: The gate valve G2 is opened.

Step s8: The substrate within the airlock chamber 12 is loaded onto the carrier 925 within the substrate loading and unloading chamber 903 by the vacuum robot 111.

(Output of Stacked Body from Deposition Apparatus and Input of Stacked Body to Vapor-Phase Lubrication Deposition Apparatus)

The output of the stacked body from the deposition apparatus 101 and the input of the stacked body to the vapor-phase lubrication deposition apparatus 102 may be carried out by the process including the following steps s11 through s38. As described above, two systems of transfer containers for the stacked body, that is, the first and second transfer containers 932 and 933, are provided from the deposition apparatus 101. The two systems of transfer containers may improve the efficiency of outputting the stacked body from the deposition apparatus 101, by performing the process of outputting the stacked body in one system and performing the process of preparing to output the stacked body in the other system. Of course, it is possible to use only one transfer container and one transfer container unit. It is assumed for the sake of convenience that the transfer container unit 934 has the configuration illustrated in FIGS. 2A and 2B. Further, the operation of the first transfer container 932 is described in the following for the sake of convenience, however, the operation of the second transfer container 933 may be performed by steps similar to those of the first transfer container 932.

Step s11: An empty transfer container unit 934 is connected to the gate valve G11 of the deposition apparatus 101 in a state in which the valve elements G12a and G12b of the gate valve G12 are closed.

Step s12: The inside of the auxiliary chamber 930 is decompressed to vacuum.

Step s13: The auxiliary chamber 930 is filled with an inert gas until the inside of the auxiliary chamber 930 becomes the atmospheric pressure or higher.

Step s14: The valve element G12a of the gate valve G12 is opened.

Step s15: The insides of the auxiliary chamber 930 and the separation chamber 40 are decompressed to vacuum.

Step s16: The valve element G12b of the gate valve G12 is opened.

Step s17: The gate valve G12 is opened.

Step s18: The substrate 44 is removed from the carrier 925 within the substrate loading and unloading chamber 903, and set on the substrate setting unit 45 within the accommodating chamber 42 of the first transfer container 932, using the vacuum robot 112.

Step s19: The gate valve G11 and the valve element G12b of the gate valve G12 are closed when the inside of the first transfer container 932 becomes full of substrates 44 (for example, 50 substrates are set).

Step s20: The auxiliary chamber 930 and the separation chamber 40 are filled with an inert gas until the insides of the auxiliary chamber 930 and the separation chamber 40 become the atmospheric pressure or higher.

Step s21: The valve element G12a of the gate valve G12 is closed.

Step s22: The inside of the auxiliary chamber 930 is vented (or exhausted) to atmospheric pressure.

Step s23: The transfer container unit 934 is removed from the deposition apparatus 101, and is set on the conveyor 935 as indicated by a thin solid arrow in FIG. 1.

Step s24: The transfer container unit 934 is transported to a substrate transport port of the vapor-phase lubrication deposition apparatus 102. The transfer container unit 934 is rotated counterclockwise by 90 degrees at a position of a corner part 936 of the conveyor 935.

Step s25: The transfer container unit 934 is connected to a gate valve G15 as indicated by a thin solid arrow in FIG. 1.

Step s26: The inside of the auxiliary chamber 930 is decompressed to vacuum.

Step s27: The auxiliary chamber 930 is filled with an inert gas until the inside of the auxiliary chamber 930 becomes the atmospheric pressure or higher.

Step s28: The valve element G12a of the gate valve G12 is opened.

Step s29: The insides of the auxiliary chamber 930 and the separation chamber 40 are decompressed to vacuum.

Step s30: The valve element G12b of the gate valve G12 is opened.

Step s31: The gate valve G15 is opened.

Step s32: The substrate 44 within the accommodating chamber 42 of the first transfer container 934 is transported to the isolation chamber 943.

Step s33: The gate valve G15 and the valve element G12b of the gate valve G12 are closed when the inside of the first transfer container 932 becomes full of the substrates 44 (for example, 50 substrates are set).

Step s34: The auxiliary chamber 930 and the separation chamber 40 are filled with an inert gas until the insides of the auxiliary chamber 930 and the separation chamber 40 become the atmospheric pressure or higher.

Step s35: The valve element G12a of the gate valve G12 is closed.

Step s36: The inside of the auxiliary chamber 930 is vented (or exhausted) to atmospheric pressure.

Step s37: The transfer container unit 934 is removed from the gate valve G15.

Step s38: The empty transfer container unit 934 is transported to the deposition apparatus 101 as indicated by a thin solid arrow in FIG. 1, and connected to the gate valve G11.

In a case in which the transfer container unit 934 having the configuration illustrated in FIGS. 3A and 3B is used, the process including the following steps s111 through s142 may be carried out in place of the steps s11 through s38.

Step s111: In a state in which the valve elements G12c and G12d of the gate valve G12 are closed, the empty transfer container unit 934 is connected to the gate valve G11 of the deposition apparatus 101.

Step s112: The inside of the auxiliary chamber 930 is decompressed to vacuum.

Step s113: The valve element G12c of the gate valve G12 is opened.

Step s114: The auxiliary chamber 930 and the separation chamber 41 are filled with an inert gas until the insides of the auxiliary chamber 930 and the separation chamber 41 become the atmospheric pressure or higher.

Step s115: The valve element G12d of the gate valve G12 is opened.

Step s116: The insides of the auxiliary chamber 930, the separation chamber, and the accommodating chamber 43 of the first transfer container 932 are decompressed to vacuum.

Step s117: The gate valve G11 is opened.

Step s118: The substrate 44 is removed from the carrier 925 within the substrate loading and unloading chamber 903, and set on the substrate setting unit 45 within the accommodating chamber 43 of the first transfer container 932, using the vacuum robot 112.

Step s119: The gate valve G11 is closed when the inside of the first transfer container 932 becomes full of the substrates 44 (for example, 50 substrates are set).

Step s120: The auxiliary chamber 930, the separation chamber 41, and the accommodating chamber 43 within the first transfer container 932 are filled with an inert gas until the insides of the auxiliary chamber 930, the separation chamber 41, and the accommodating chamber 43 become the atmospheric pressure or higher.

Step s121: The valve element G12d of the gate valve G12 is closed.

Step s122: The insides of the auxiliary chamber 930 and the separation chamber 41 are decompressed to vacuum.

Step s123: The valve element G12c of the gate valve G12 is closed.

Step s124: The inside of the auxiliary chamber 930 is set to the atmospheric pressure.

Step s125: The transfer container unit 934 is removed from the deposition apparatus 101, and is set on the conveyor 935 as indicated by a thin solid arrow in FIG. 1.

Step s126: The transfer container unit 934 is transported to the substrate transport port of the vapor-phase lubrication deposition apparatus 102. The transfer container unit 934 is rotated counterclockwise by 90 degrees at the position of the corner part 936 of the conveyor 935.

Step s127: The transfer container unit 934 is connected to the gate valve G15 as indicated by a thin solid arrow in FIG. 1.

Step s128: The inside of the auxiliary chamber 930 is decompressed to vacuum.

Step s129: The valve element G12c of the gate valve G12 is opened.

Step s130: The auxiliary chamber 930 and the separation chamber 41 are filled with an inert gas until the insides of the auxiliary chamber 930 and the separation chamber 41 become the atmospheric pressure or higher.

Step s131: The valve element G12d of the gate valve G12 is opened.

Step s132: The insides of the auxiliary chamber 930, the separation chamber 41, and the accommodating chamber 43 within the first transfer container 932 are decompressed to vacuum.

Step s133: The gate valve G15 is opened.

Step s134: The substrate 44 within the accommodating chamber 43 of the first transfer container 934 is transported to the isolation chamber 943.

Step s135: The gate valve G15 is closed.

Step s136: The auxiliary chamber 930, the separation chamber 41, and the accommodating chamber 43 within the first transfer container 932 are filled with an inert gas until the insides of the auxiliary chamber 930, the separation chamber 41, and the accommodating chamber 43 become the atmospheric pressure or higher.

Step s137: The valve element G12d of the gate valve G12 is closed.

Step s138: The insides of the auxiliary chamber 930 and the separation chamber 41 are decompressed to vacuum.

Step s139: The gate element G12c of the gate valve G12 is closed.

Step s140: The inside of the auxiliary chamber 930 is set to the atmospheric pressure.

Step s141: The transfer container unit 934 is removed from the gate valve G15.

Step s142: The empty transfer container unit 934 is transported to the deposition apparatus 101 as indicated by a thin solid arrow in FIG. 1, and connected to the gate valve G11.

The transport of the transfer container unit 934 from the deposition apparatus 101 to the conveyor 935, from the conveyor 935 to the vapor-phase lubrication deposition apparatus 102, and from the vapor-phase lubrication deposition apparatus 102 to the deposition apparatus 101 may be made using a known transport apparatus (or a transport means), the illustration of which will be omitted.

Returning now to the description of FIG. 1, the vapor-phase lubrication deposition apparatus 102 may include the isolation chamber 943 to be filled with the inert gas, a vapor-phase lubrication process chamber 944, an airlock chamber 945, and a transport cassette return path chamber 947 that are connected via gate valves G6, G7, G9, and G10. A substrate output robot 946 for outputting the stacked body formed with the lubricant layer may be provided adjacent to the airlock chamber 945 via a gate valve G8. The substrate output robot 946 is an example of the transport apparatus. A transport cassette 948 configured to transport a plurality of stacked bodies (for example, 50 stacked bodies) may be transported amongst each of the chambers 943 through 945, and 947.

The stacked bodies (hereinafter also referred to as "substrates") within the vapor-phase lubrication deposition apparatus 102 may move so that the following processes are repeated, after the above described steps s25 through s35 or the above described steps s127 through s139, and processes including the following steps s41 through s53 may be performed continuously.

Step s25 or s127: The transfer container unit 934 is connected to the gate valve G15.

Steps s26 to s30 or steps s128 to s132: The separation chamber 40 in the configuration illustrated in FIGS. 2A and 2B is decompressed to vacuum in a case in which the inside of the separation chamber 40 is filled with an inert gas, or the accommodating chamber 43 within the first transfer container 932 in the configuration illustrated in FIGS. 3A and 33 is decompressed to vacuum in a case in which the inside of the accommodating part 43 is filled with an inert gas, in order to decompress the inside of the transfer container unit 934 to vacuum.

Step 31 or s133: The gate valve G15 is opened.

Step s32 or s134: The substrate 44 within the first transfer container 932 is transported to the isolation chamber 943.

Steps s33 to s35 or steps s135 to s139: The valve elements G12a and G12b of the gate valve G12 and the gate valve G15 are closed in the case of the configuration illustrated in FIGS. 2A and 2B, and the valve elements G12c and G12d of the gate valve G12 and the gate valve G15 are closed in the case of the configuration illustrated in FIGS. 3A and 3B.

Step s41: The gate valve G6 is opened.

Step s42: The transport cassette 948 within the isolation chamber 943 is transported into the vapor-phase lubrication process chamber 944.

Step s43: The lubricant layer is formed on the stacked body in the transport cassette 948 within the vapor-phase lubrication process chamber 944.

Step s44: The gate valve G7 is opened, and the transport cassette 948 accommodating the stacked body having the lubricant layer formed thereof is moved into the airlock chamber 945 in the vacuum state.

Step s45: The gate valve G7 is closed.

Step s46: The inside of the airlock chamber 945 is set to atmospheric pressure.

Step s47: The gate valve G8 is opened.

Step s48: The processed stacked bodies (that is, stacked bodies formed with the lubricant layer) are extracted by the substrate output robot 946.

Step s49: The gate valve GB is closed.

Step s50: The inside of the airlock chamber 945 is decompressed to vacuum.

Step s51: The gate valve G9 is opened.

Step s52: The empty transport cassette 948 is moved to the isolation chamber 943 via the return path chamber 947 that is decompressed to vacuum.

Step s53: The gate valve G10 is opened in the decompression state of the isolation chamber 943, and the empty transport cassette 948 is supplied into the isolation chamber 943.

Figure 4:
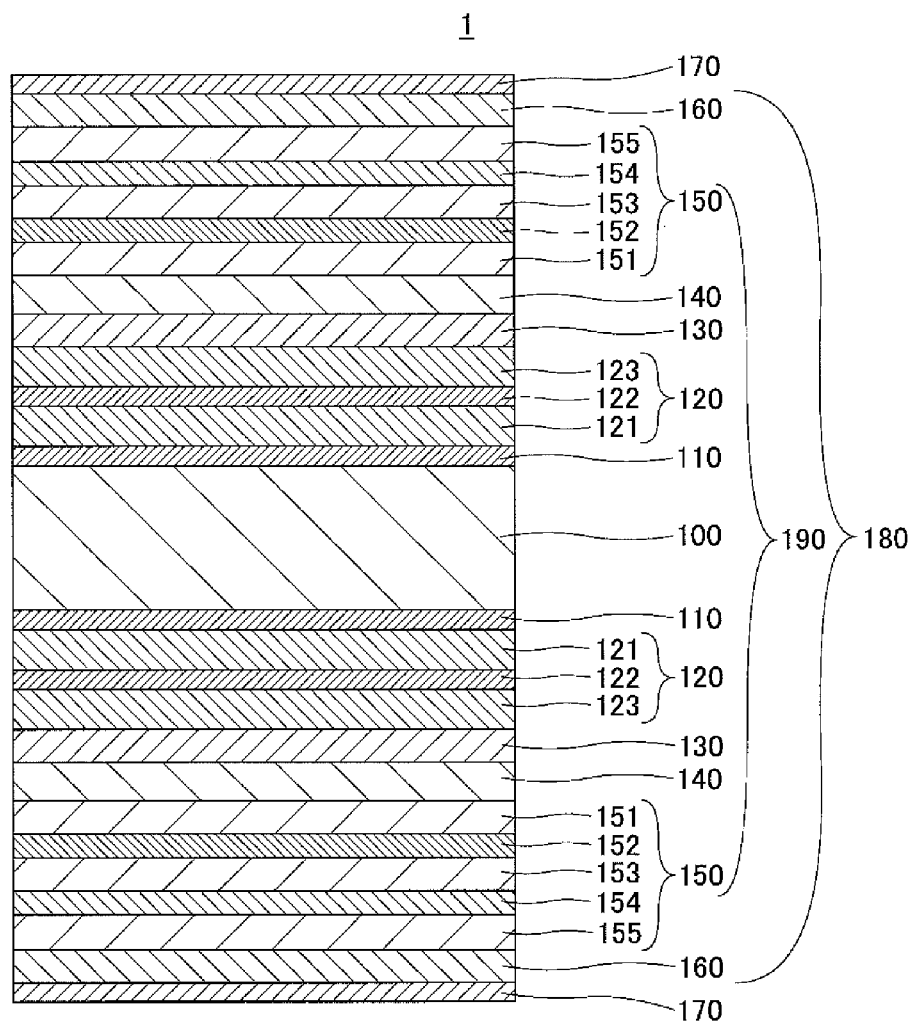
FIG. 4 is a cross sectional view illustrating an example of a magnetic recording medium fabricated by the fabrication apparatus illustrated in FIG. 1.

FIG. 4 is a cross sectional view illustrating an example of a magnetic recording medium 1 fabricated by the fabrication apparatus illustrated in FIG. 1. The data recording system with respect to the magnetic recording medium 1 may be an in-plane (or longitudinal) recording system or a perpendicular recording system, however, it is assumed for the sake of convenience that the magnetic recording medium 1 in this embodiment employs the perpendicular recording system.

The magnetic recording medium 1 may include a substrate 100, a bonding layer 110 formed on the substrate 100, a soft magnetic underlayer 120 formed on the bonding layer 110, an orientation control layer 130 formed on the soft magnetic underlayer 120, a nonmagnetic underlayer 140 formed on the orientation control layer 130, a perpendicular recording layer 150 formed on the nonmagnetic underlayer 140, a protection layer 160 formed on the perpendicular recording layer 150, and a lubricant layer 170 formed on the protection layer 160. The substrate 100 may correspond to the substrate 44 illustrated in FIGS. 2A and 2B and FIGS. 3A and 3B. The perpendicular recording layer 150 is an example of a magnetic recording layer. In this embodiment, the magnetic recording medium 1 has a configuration in which the bonding layer 110, the soft magnetic underlayer 120, the orientation control layer 130, the nonmagnetic underlayer 140, the perpendicular recording layer 150, the protection layer 160, and the lubricant layer 170 are formed on both sides of the substrate 100. In the following description, a stacked structure in which the bonding layer 110 up to the protection layer 160 are stacked on both sides of the substrate 100, that is, the stacked structure in which all of the layers of the magnetic recording medium 1 except the lubricant layer 170 are formed on both sides of the substrate 100, may also be referred to as a "stacked substrate 180", where appropriate. Further, in the following description, a stacked structure in which the bonding layer up to the perpendicular recording layer 150 are stacked on both sides of the substrate 100, that is, the stacked structure in which all of the layers of the magnetic recording medium 1 except the protection layer 160 and the lubricant layer 170 are formed on both sides of the substrate 100, may also be referred to as a "stacked body 190", where appropriate.

In this embodiment, the substrate 100 may be made of a nonmagnetic material. For example, the substrate 100 may be formed by a metal substrate made of a metal material such as aluminum, aluminum alloy, and the like. For example, the substrate 100 may be formed by a nonmetallic substrate made of a nonmetallic material such as glass, ceramics, silicon, silicon carbide, carbon, and the like. In addition, the substrate 100 may have a NiP layer or a NiP alloy layer, formed on the surface of the metal substrate or the nonmetallic substrate, by plating, sputtering, or the like.

For example, the glass substrate may also be made of float glass, glass ceramics, and the like. For example, general-purpose soda-lime glass, aluminosilicate glass, and the like may be used for the flat glass. In addition, lithium glass ceramics, and the like, for example, may be used for the glass ceramics. Further, a sintered body having general-purpose aluminum oxide, aluminum nitride, silicon nitride, or the like as its main component, or a fiber reinforced material of such materials, for example, may be used for the ceramic substrate.

Corrosion of the substrate 100 may progress due to the effects of adsorbed gas or moisture on the surface, diffusion of the substrate component, and the like when the substrate 100 makes contact with the soft magnetic underlayer 120 having Co or Fe as its main component as will be described later. For this reason, the bonding layer 110 may preferably be provided between the substrate 100 and the soft magnetic underlayer 120. The material used for the bonding layer 110 may suitably be selected from Cr, Cr alloy, Ti, Ti alloy, and the like, for example. The bonding layer 110 may preferably have a thickness of 2 nm (20 Å) or greater.

The soft magnetic underlayer 120 may be provided to reduce noise at the time of recording and reproduction, in a case in which the perpendicular recording system is employed. In this embodiment, the soft magnetic underlayer 120 may include a first soft magnetic layer 121 formed on the bonding layer 110, a spacer layer 122 formed on the first soft magnetic layer 121, and a second soft magnetic layer 123 formed on the spacer layer 122. In other words, the soft magnetic underlayer 120 may have a structure in which the spacer layer 122 is sandwiched between the first soft magnetic layer 121 and the second soft magnetic layer 123.

The first soft magnetic layer 121 and the second soft magnetic layer 123 may preferably be made of a material including Fe:Co in a range of 40:60 to 70:30 in atomic ratio (at %). In order to improve the permeability and corrosion resistance, the first soft magnetic layer 121 and the second soft magnetic layer 123 may preferably include an element selected from a group consisting of Ta, Nb, Zr, and Cr in a range of 1 at % to 8 at %. In addition, the spacer layer 122 may be made of Ru, Re, Cu, or the like, and may preferably be made of Ru in particular.

The orientation control layer 130 may be provided to improve the recording and reproducing characteristics, by reducing crystal grain sizes of the perpendicular recording layer 150 that is formed via the nonmagnetic underlayer 140. The material used for the orientation control layer 130 is not limited to a particular material, however, a material having a hcp structure, a fcc structure, or an amorphous structure may preferably be used for the orientation control layer 130. The orientation control layer 130 may preferably be made of an Ru alloy, Ni alloy, Co alloy, Pt alloy, or Cu alloy in particular, and the orientation control layer 130 may have a multi-layer structure in which such alloys are stacked. For example, a multi-layer structure formed by Ni alloy and Ru alloy, a multi-layer structure formed by Co alloy and Ru alloy, or a multi-layer structure formed by Pt alloy and Ru alloy, may preferably be formed from the side of the substrate 100.

The nonmagnetic underlayer 140 may be provided to suppress disturbance in crystal growth at an initial stacked part of the perpendicular recording layer 150 that is stacked on the nonmagnetic underlayer 140, and to suppress noise generation at the time of the recording and reproduction. However, the nonmagnetic underlayer 140 may be omitted.

In this embodiment, the nonmagnetic underlayer 140 may preferably be made of a material including a metal having Co as its main component, and additionally including an oxide. A Cr-content of the nonmagnetic underlayer 140 may preferably be in a range of 25 at % to 50 at %. For example, the oxide included in the nonmagnetic underlayer 140 may preferably be an oxide of Cr, Si, Ta, Al, Ti, Mg, Co, or the like. $TiO_2$, $Cr_2O_3$, $SiO_2$, or the like may particularly be preferable for use as the oxide included in the nonmagnetic underlayer 140. The oxide-content of the nonmagnetic underlayer 140 may preferably be in a range of 3 mol % to 18 mol %, with respect to a mol total calculated by regarding an alloy of Co, Cr, Pt, or the like, for example, forming the magnetic grains (or particles), as one compound.

In this embodiment, the perpendicular recording layer 150 may include a first magnetic layer 151 formed on the nonmagnetic underlayer 140, a first nonmagnetic layer 152 formed on the first magnetic layer 151, a second magnetic layer 153 formed on the first nonmagnetic layer 152, a second nonmagnetic layer 154 formed on the second magnetic layer 153, and a third magnetic layer 155 formed on the second nonmagnetic layer 154. In other words, in the perpendicular recording layer 150, the first nonmagnetic layer 152 is sandwiched between the first magnetic layer 151 and the second magnetic layer 153, and the second nonmagnetic layer 154 is sandwiched between the second magnetic layer 153 and the third magnetic layer 155.

The first magnetic layer 151, the second magnetic layer 153, and the third magnetic layer 155 may be provided to store data by inverting the magnetization direction in a direction taken along the thickness of the perpendicular recording layer 150 by the magnetic energy supplied from a magnetic head 3 (illustrated in FIG. 5 which will be described later) and maintaining the state of the magnetization. The first magnetic layer 151, the second magnetic layer 153, and the third magnetic layer 155 may form the magnetic layer of this embodiment.

The first magnetic layer 151, the second magnetic layer 153, and the third magnetic layer 155 may preferably include metal magnetic grains having Co as its main component, and a nonmagnetic oxide, and have a granular structure in which the magnetic grains are surrounded by the oxide.

For example, the oxide included in the first magnetic layer 151, the second magnetic layer 153, and the third magnetic layer 155 may preferably be Cr, Si, Ta, Al, Ti, Mg, Co, or the like. $TiO_2$, $Cr_2O_3$, $SiO_2$, or the like may particularly be preferable for use as the oxide included in the first magnetic layer 151, the second magnetic layer 153, and the third magnetic layer 155. In addition, the lowermost first magnetic layer 151 of the perpendicular recording layer 150 may preferably include a complex (or composite) oxide made up of two or more kinds of oxides. The complex oxide included in the first magnetic layer 151 may preferably be $Cr_2O_3$—$SiO_2$, $Cr_2O_3$—$TiO_2$, $Cr_2O_3$—$SiO_2$—$TiO_2$, or the like.

In addition, the material used for the magnetic grains of the first magnetic layer 151, the second magnetic layer 153, and the third magnetic layer 155 may preferably include compositions such as 90(Co14Cr18Pt)-10($SiO_2$) {mol concentration of 90 mol % calculated using magnetic particles having a Cr-content of 14 at %, a Pt-content of 18 at %, and the remainder Co as one compound, and 10 mol % of an oxide component having $SiO_2$}, 92(Co10Cr16Pt)-8($SiO_2$), 94(Co8Cr14Pt4Nb)-6($Cr_2O_3$), (CoCrPt)—($Ta_2O_5$), (CoCrPt)—($Cr_2O_3$)—($TiO_2$), (CoCrPt)—($Cr_2O_3$)—($SiO_2$), (CoCrPt)—($Cr_2O_3$)—($SiO_2$)—($TiO_2$), (CoCrPtMo)—(Ti), (CoCrPtW)—($TiO_2$), (CoCrPtB)—($Al_2O_3$), (CoCrPtTaNd)—(MgO), (CoCrPtBCu)—($Y_2O_3$), (CoCrPtRu)—($SiO_2$), and the like.

The first nonmagnetic layer 152 and the second nonmagnetic layer 154 may be provided to facilitate the magnetic inversion in each of the magnetic layers, namely, the first magnetic layer 151, the second magnetic layer 153, and the third magnetic layer 155 forming the perpendicular recording layer 150, and to reduce noise by reducing variance of the magnetic inversions of the magnetic particles as a whole. In this embodiment, the first nonmagnetic layer 152 and the second nonmagnetic layer 154 may preferably include Ru and Co, for example.

In the example illustrated in FIG. 4, the perpendicular recording layer 150 includes magnetic layers (first, second, and third magnetic layers 151, 153, and 155) forming the 3-layer structure, however, the structure of the magnetic layers is not limited to the 3-layer structure, and the magnetic layers may form a multi-layer structure of four (4) or more layers. In addition, although a nonmagnetic layer (a corresponding one of first and second nonmagnetic layers 152 and 154) is interposed between two adjacent magnetic layers (two adjacent ones of first, second, and third magnetic layers 151, 153, and 155) forming the perpendicular recording layer 150, the structure of the magnetic layers forming the perpendicular recording layer 150 is not limited to such a structure. For example, the perpendicular recording layer 150 may have a structure in which two magnetic layers having mutually different compositions are stacked.

The protection layer 160 may be provided to prevent corrosion of the perpendicular recording layer 150, and to prevent damage to the medium surface or the magnetic head 3 itself when the magnetic head 3 and the magnetic recording medium 1 make contact. The protection layer 160 may be provided to also improve the corrosion resistance of the magnetic recording medium 1.

The protection layer 160 may be made of a known material. For example, the protection layer 160 may be made of a material including C, $SiO_2$ or $ZrO_2$, for example. From the point of view of maintaining the hardness of the protection layer 160 and making the protection layer 160 relatively thin, the protection layer 160 may preferably be made of amorphous hard carbon or DLC (Diamond Like Carbon). From the point of view of realizing a high recording density, the protection layer 160 may preferably have a thickness of 1 nm to 10 nm, for example, in order to reduce the distance between the magnetic head 3 and the magnetic recording medium 1 in a magnetic storage apparatus, which will be described later in conjunction with FIG. 5.

The lubricant layer 170 may be provided to suppress friction between the magnetic head 3 and the surface of the magnetic recording medium 1 when the magnetic head 3 makes contact with the magnetic recording medium 1, and to improve the corrosion resistance of the magnetic recording medium 1. The lubricant layer 170 may be made of a known lubricant material. For example, the lubricant layer 170 may preferably be made of a lubricant such as perfluoropolyether, fluorinated alcohol, fluorinated carboxylic acid, or the like. From the point of view of realizing a high recording density, the lubricant layer 170 may preferably have a thickness of 1 nm to 2 nm, for example, in order to reduce the distance between the magnetic head 3 and the magnetic recording medium 1 in the magnetic storage apparatus which will be described later in conjunction with FIG. 5.

When forming the lubricant layer 170 by the vapor-phase lubrication, the lubricant is heated to a temperature in a range of 90° C. to 150° C., and vapor of the lubricant is introduced into the reaction chamber. The pressure within the reaction chamber is set to approximately 10 Pa, for example, and an exposure time of the stacked body in the reaction chamber is set to approximately 10 seconds, for example, in order to form the lubricant layer 170 on the surface of the protection layer 160 to a thickness of approximately 1 nm, for example.

Figure 5:
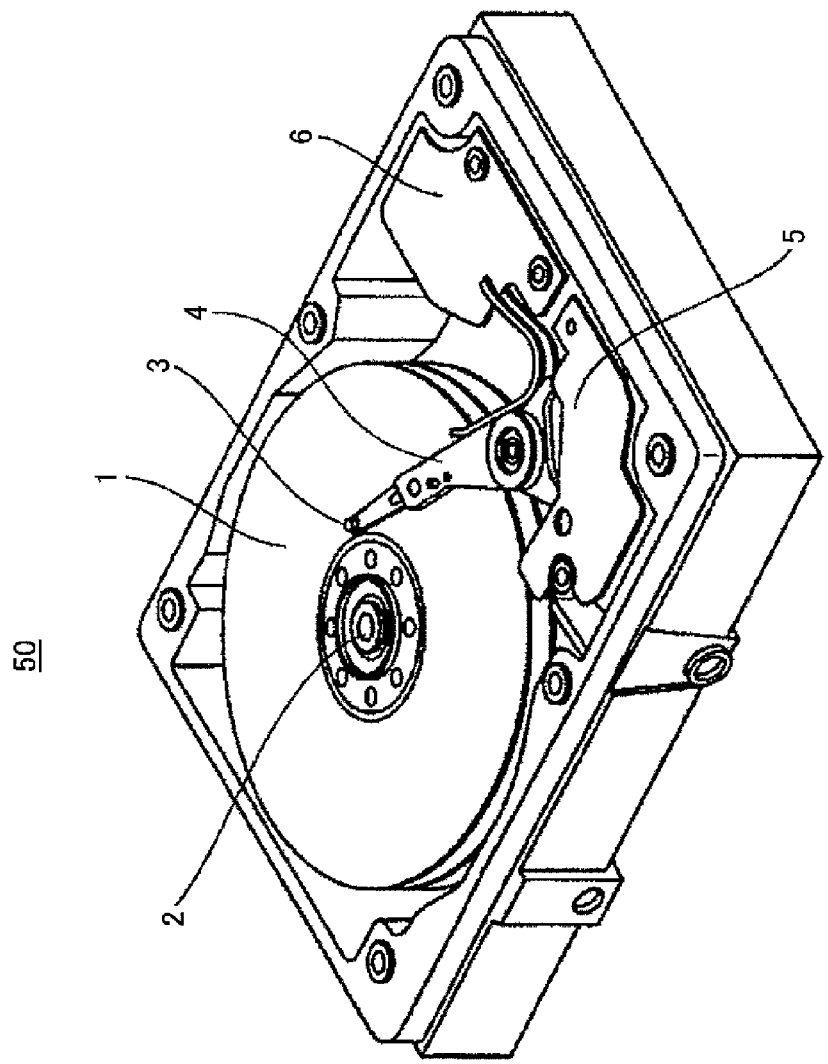
FIG. 5 is a perspective view illustrating an example of a configuration of a magnetic storage apparatus having the magnetic recording medium fabricated in one embodiment of the present invention.

FIG. 5 is a perspective view illustrating an example of a configuration of the magnetic storage apparatus having the magnetic recording medium 1 fabricated in this embodiment of the present invention.

A magnetic storage apparatus 50 illustrated in FIG. 3 may be provided with the magnetic recording medium 1 that magnetically records data, a rotary driving part 2 that rotationally drives the magnetic recording medium 1, the magnetic head 3 that writes (or records) data to and reads (or reproduces) the data from the magnetic recording medium 1, a carriage 4 mounted with the magnetic head 3, a head driving part 5 that moves the magnetic head 3 via the carriage 4 relative to the magnetic recording medium 1, and a signal processor 6. The signal processor 6 may subject data input from an external host unit (not illustrated) or the like to a known signal processing, in order to supply recording signals suited for the recording on the magnetic recording medium 1 to the magnetic head 3. The signal processor 6 may subject the signals read from the magnetic recording medium 1 by the magnetic head 3 to a known signal processing, and output reproduced data to the external host unit or the like.

In the example illustrated in FIG. 5, the magnetic recording medium 1 is a magnetic disk having a disk shape. The magnetic disk includes a magnetic recording layer to record the data, on at least one of the two sides (or surfaces) of the magnetic disk. The magnetic recording layer may be provided on both sides (or both surfaces) of the magnetic disk, as illustrated in FIG. 2. Further, in the example illustrated in FIG. 3, a plurality of magnetic recording media (in this example, three (3) magnetic recording media) are provided in the magnetic storage apparatus 50. However, the number of magnetic recording media 1 provided in the magnetic storage apparatus 50 may be one (1) or greater.

Further, the present invention is not limited to the embodiment, but various variations and modifications may be made without departing from the scope of the present invention.

Practical Example

Next, a description will be given of a practical example PE1 in which a magnetic recording medium is fabricated by the following fabrication method and evaluated. More particularly, the magnetic recording medium is fabricated using the fabrication apparatus illustrated in FIG. 1. First, a cleaned glass substrate (manufactured by Konica Minolta, Inc. and having an outer diameter of 2.5 inches) is placed within the airlock chamber 12 of the fabrication apparatus illustrated in FIG. 1, and thereafter placed into the carrier 925 using the vacuum robot 111 within the substrate input chamber 902, in order to form stacked layers on the substrate surface. The inside of the deposition chambers are decompressed (or evacuated) to a vacuum (or base pressure) of $1 \times 10^{-5}$ Pa.

Next, a bonding layer having a thickness of 10 nm is deposited on the glass substrate within the process chamber 905 in which the argon gas pressure is 1 Pa, using a 60Cr-50Ti target. In addition, a first soft magnetic layer having a thickness of 34 nm is deposited on the bonding layer within the process chamber 906 in which the argon gas pressure is 1 Pa and the substrate temperature is 100° C. or lower, using a 46Fe-46Co-5Zr-3B {Fe-content of 46 at %, Co-content of 46 at %, Zr-content of 5 at %, and B-content of 3 at %} target. In addition, an Ru layer having a thickness of 0.76 nm is deposited on the first soft magnetic layer within the process chamber 908, using an Ru target. Further, a second soft magnetic layer having a thickness of 34 nm is deposited on the Ru layer within the process chamber 909, using a 46Fe-46Co-5Zr-3B target. The first and second soft magnetic layers sandwiching the Ru layer are formed as the soft magnetic underlayer.

Next, a first underlayer having a thickness of 5 nm is deposited on the soft magnetic underlayer within the process chamber 910 in which the argon gas pressure is 1 Pa, using a Ni-6W {W-content of 6 at %, and the remainder Ni} target. A second underlayer having a thickness of 10 nm is deposited on the first underlayer within the process chamber 911, using an Ru target. A third underlayer having a thickness of 10 nm is deposited within the process chamber 912 in which the argon gas pressure is 1 Pa, using an Ru target. An underlayer having a 3-layer structure is formed by the first, second, and third underlayers.

Next, a magnetic layer having a multi-layer structure is deposited on the underlayer having the 3-layer structure.

More particularly, a $Co6Cr16Pt6Ru-4SiO_2-3Cr_2O_3-2TiO_2$ layer having a thickness of 6 nm is deposited on the third underlayer within the process chamber 913 in which the argon gas pressure is 1 Pa. In addition, a $Co11-5Cr13Pt10Ru-4SiO_2-3Cr_2O_3-2TiO_2$ layer having a thickness of 6 nm is deposited on the $Co6Cr16Pt6Ru-4SiO_2-3Cr_2O_3-2TiO_2$ layer within the process chamber 915 in which the argon gas pressure is 1 Pa. Further, a Co15Cr16Pt6B layer having a thickness of 3 nm is deposited on the $Co11-5Cr13Pt10Ru-4SiO_2-3Cr_2O_3-2TiO_2$ layer within the process chamber 916 in which the argon gas pressure is 1 Pa.

Next, a carbon protection layer having a thickness of 2.5 nm is deposited on the magnetic layer within the process chambers 918 and 919, using an ion beam, in order to obtain the stacked body (or magnetic recording medium). The base pressure within the process chambers 918 and 919 is $1 \times 10^{-5}$ Pa, a mixture gas in which 4% methane is mixed to hydrogen gas is used for the process gas, and the gas pressure is 8 Pa. The chamber 920 is used as an auxiliary chamber, and no process gas is supplied to the auxiliary chamber, and the base pressure within the auxiliary chamber is $1 \times 10^{-5}$ Pa.

The stacked body that is obtained is removed from the carrier 925 and supplied into the first transfer container 932, by the vacuum robot 112 within the substrate output chamber 922. The inside of the first transfer container 932 is filled with argon gas at a pressure 50 Pa. Thereafter, the transfer container unit 934 is disconnected from the deposition apparatus 101, and after being transported by the conveyor 935 for approximately 15 minutes, is connected to the isolation chamber 943 of the vapor-phase lubrication deposition apparatus 102 via the gate valve G12, in order to transport the stacked body to the isolation chamber 943.

The base pressure within each of the isolation chamber 943, the vapor-phase lubrication process chamber 944, the airlock chamber 945, and the return path chamber 947 forming the vapor-phase lubrication deposition apparatus 102 is set to $1 \times 10^{-5}$ Pa. In addition, the inside of the isolation chamber 943 is set to vacuum, and perfluoropolyether gas is supplied at 20 Pa into the vapor-phase lubrication process chamber 944, and no process gas is supplied to isolation chamber 943, the airlock chamber 945, and the return path chamber 947. As a result, a perfluoropolyether lubricant layer having a thickness of 15 Å is formed on the surface of the stacked body by the vapor-phase lubrication deposition apparatus 102.

The stacked body (or magnetic recording medium) formed with the lubricant layer is removed outside the fabrication apparatus, to the atmosphere, using the substrate output robot 946.

The method described above is used to fabricate 10,000 magnetic recording media, and the inconsistency in the thickness of the lubricant layer, the recording and reproducing characteristics (SNR: Signal-to-Noise Ratio), and the OW (Over-Write) performance of the 10,000 magnetic recording media are evaluated. The inside of each of the transfer containers 932 and 933 is cleaned for every 50 transports.

As a result, the inconsistency in the thickness of the lubricant layer is ±0.4 Å, the SNR is 25.1 dB, and the OW performance is 39.0 dB. Hence, it was confirmed that the inconsistency in the thickness of the lubricant layer is small, and that the electromagnetic conversion characteristics of the magnetic recording medium is satisfactory. With regard to the evaluation of the inconsistency in the thickness of the lubricant layer, the thickness of the lubricant layer is measured at twenty (20) locations on the surface of the magnetic recording medium using a FT-IR (Fourier Transform-Infra-Red Spectrometer), and the variance with respect to the average value of the measured thicknesses is evaluated. With regard to the evaluation of the recording and reproducing characteristics, a magnetic head having a single magnetic pole in a recording part and a GMR (Giant Magneto Resistive) element in a reproducing part is used for the measurement, by setting the recording frequency condition to a linear recording density of 1000 kFCI. On the other hand, with regard to the evaluation of the OW performance, a signal of 500 kFCI is written on the magnetic recording medium, a signal of 67 kFCI is written over the signal of 500 kFCI, and the remaining component of the first written signal of 500 kFCI is measured.

According to the embodiment and practical examples described above, the quality of the formed layer may be prevented from deteriorating, and the productivity may be improved, simultaneously.

Further, the present invention is not limited to these practical examples, but various variations and modifications may be made without departing from the scope of the present invention.

What is claimed is:

1. A method of fabricating a magnetic recording medium by sequentially forming a magnetic recording layer, a protection layer, and a lubricant layer on a stacked body, comprising:
    enclosing the stacked body in a transfer container unit without exposing the stacked body to atmosphere after forming the protection layer on the stacked body by a deposition apparatus;
    transporting the transfer container unit from the deposition apparatus to a vapor-phase lubrication deposition apparatus that is provided independently of the deposition apparatus; and
    removing the stacked body enclosed within the transfer container unit from the transfer container unit without exposing the stacked body to the atmosphere, and forming the lubricant layer on the protection layer of the stacked body within the vapor-phase lubrication deposition apparatus by vapor-phase lubrication,
    wherein the transfer container unit includes an auxiliary chamber detachably connectable to one of the deposition apparatus and the vapor-phase lubrication deposition apparatus at one time, and a transfer container configured to enclose the stacked body,
    wherein the transfer container includes a first gate valve configured to connect the transfer container and the auxiliary chamber, a separation chamber partitionable by first and second valve elements of the first gate valve, and an accommodating chamber configured to accommodate the stacked body, and
    wherein the separation chamber and the auxiliary chamber within the transfer container communicate with each other in a state in which the first valve element is open, and the separation chamber and the accommodating chamber within the transfer container communicate with each other in a state in which the second valve element is open.

2. The method of fabricating the magnetic recording medium as claimed in claim 1, wherein an inside of the transfer container is vacuum.

3. The method of fabricating the magnetic recording medium as claimed in claim 1, wherein an inside of the transfer container is an inert gas atmosphere.

4. The method of fabricating the magnetic recording medium as claimed in claim 3, wherein the inside of transfer container has an inert gas pressure in a range of 10 Pa to 200 Pa.

5. The method of fabricating the magnetic recording medium as claimed in claim 1, wherein the transporting transports the transfer container unit from the deposition apparatus to the vapor-phase lubrication deposition apparatus by a transport apparatus.

6. The method of fabricating the magnetic recording medium as claimed in claim 1, further comprising:
    providing an other transfer container unit having a configuration identical to the transfer container unit;
    performing the enclosing, the transporting, and the removing with respect to the other transfer container unit; and
    cleaning an inside of the transfer container unit after forming the lubricant layer on the protection layer of the stacked body within the vapor-phase lubrication deposition apparatus, without stopping the deposition apparatus that forms the protection layer and the vapor-phase lubrication deposition apparatus that forms the lubricant layer with respect to the stacked body enclosed in the other transfer container unit that is transported from the deposition apparatus to the vapor-phase lubrication deposition apparatus.

7. The method of fabricating the magnetic recording medium as claimed in claim 1, further comprising:
    detachably connecting the auxiliary chamber of the transfer container unit to the deposition apparatus via a second gate valve when forming the protection layer on the stacked body within the deposition apparatus; and
    detachably connecting the auxiliary chamber of the transfer container unit to the vapor-phase lubrication deposition apparatus via a third gate valve when forming the lubricant layer on the protection layer of the stacked body within the vapor-phase lubrication deposition apparatus.

8. The method of fabricating the magnetic recording medium as claimed in claim 7, further comprising:
    after forming the protection layer on the stacked body within the deposition apparatus and before the transporting,
        in a state in which the first and second valve elements are closed, decompressing the auxiliary chamber of the transfer container unit that is connected to the deposition apparatus to a vacuum and filling an inert gas until an inside of the auxiliary chamber becomes an atmospheric pressure or higher;
        opening the first valve element and decompressing the auxiliary chamber and the separation chamber of the transfer container unit to a vacuum;
        opening the second valve element and the second gate valve, and transporting the stacked body having the protection layer formed thereon to the accommodating chamber of the transfer container unit;
        closing the second gate valve and the second valve element and filling an inert gas until insides of the auxiliary chamber and the separation chamber become the atmospheric pressure or higher;
        closing the first valve element and venting the inside of the auxiliary chamber to the atmospheric pressure; and
        disconnecting the transfer container unit from the second gate valve to be transported to the vapor-phase lubrication deposition apparatus by the transporting.

9. The method of fabricating the magnetic recording medium as claimed in claim 8, further comprising:
    after transporting the transfer container unit to the vapor-phase lubrication deposition apparatus and before forming the lubricant layer on the protection layer of the stacked body,
        decompressing the auxiliary chamber of the transfer container unit that is connected to the vapor-phase lubrication deposition apparatus to a vacuum and filling an inert gas until an inside of the auxiliary chamber becomes an atmospheric pressure or higher;

opening the first valve element and decompressing the auxiliary chamber and the separation chamber to a vacuum;

opening the second valve element and the third gate valve, and transporting the stacked body having the protection layer formed thereon from the accommodating chamber of the transfer container unit to the vapor-phase lubrication deposition apparatus;

closing the third gate valve and the second valve element and filling an inert gas until insides of the auxiliary chamber and the separation chamber become the atmospheric pressure or higher;

closing the first valve element and venting the inside of the auxiliary chamber to the atmospheric pressure; and disconnecting the transfer container unit from the third gate valve.

10. The method of fabricating the magnetic recording medium as claimed in claim 7, further comprising:

after forming the protection layer on the stacked body within the deposition apparatus and before the transporting, in a state in which the first and second valve elements are closed, decompressing the auxiliary chamber of the transfer container unit that is connected to the deposition apparatus to a vacuum;

opening the first valve element and filling an inert gas until insides of the auxiliary chamber and the separation chamber of the transfer container unit become an atmospheric pressure or higher;

opening the second valve element and decompressing insides of the auxiliary chamber, the separation chamber, and the accommodating chamber of the transfer container unit to a vacuum;

opening the second gate valve and transporting the stacked body having the protection layer formed thereon to the accommodating chamber;

closing the second valve element and decompressing the insides of the auxiliary chamber and the separation chamber to a vacuum;

closing the first valve element and putting the inside of the auxiliary chamber to the atmospheric pressure; and disconnecting the transfer container unit from the second gate valve to be transported to the vapor-phase lubrication deposition apparatus by the transporting.

11. The method of fabricating the magnetic recording medium as claimed in claim 10, further comprising:

after transporting the transfer container unit to the vapor-phase lubrication deposition apparatus and before forming the lubricant layer on the protection layer of the stacked body, decompressing the auxiliary chamber of the transfer container unit that is connected to the vapor-phase lubrication deposition apparatus to a vacuum;

opening the the first valve element and filling an inert gas until insides of the auxiliary chamber and the separation chamber of the transfer container unit become an atmospheric pressure or higher;

opening the second valve element and decompressing the auxiliary chamber, the separation chamber, and the accommodating chamber of the transfer container unit to a vacuum;

opening the third gate valve and transporting the stacked body having the protection layer formed thereon from the accommodating chamber to the vapor-phase lubrication deposition apparatus;

closing the third gate valve and filling an inert gas until insides of the auxiliary chamber, the separation chamber, and the accommodating chamber become the atmospheric pressure or higher;

closing the second valve element and decompressing the auxiliary chamber and the separation chamber to a vacuum;

closing the first valve element and putting the inside of the auxiliary chamber to the atmospheric pressure; and disconnecting the transfer container unit from the third gate valve.

* * * * *